Oct. 22, 1940.   M. E. BROOKS ET AL   2,218,503
STRETCHING MECHANISM
Filed Dec. 14, 1938   3 Sheets-Sheet 3
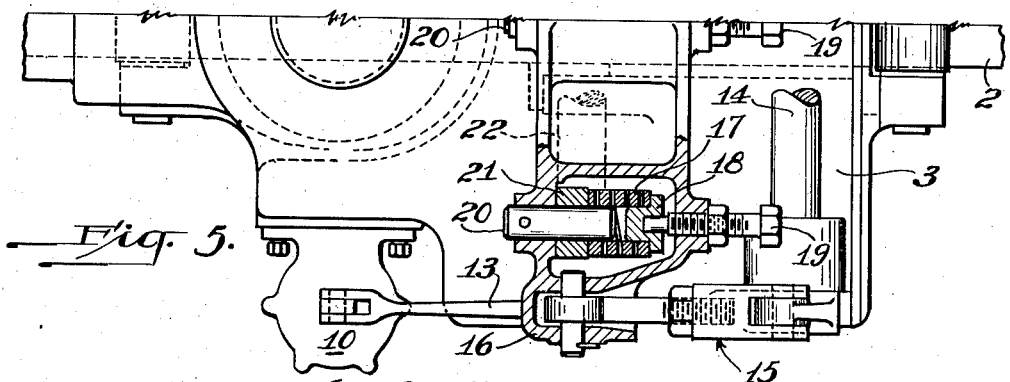
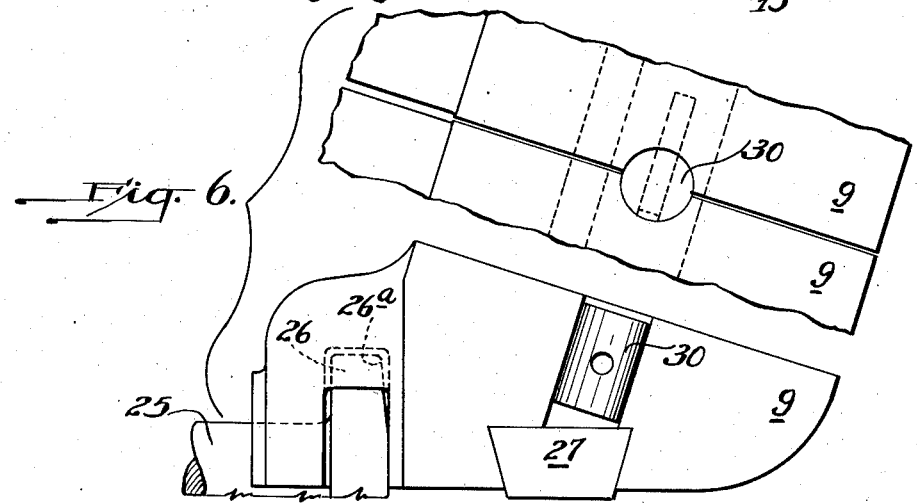
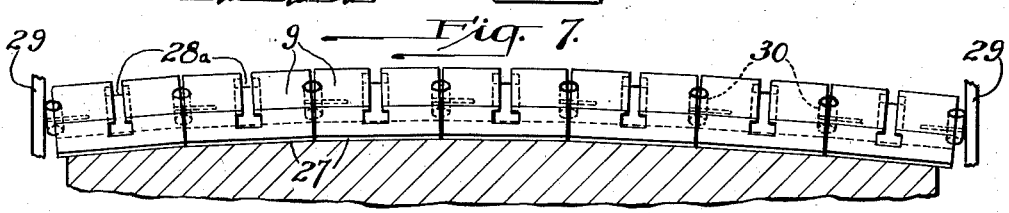
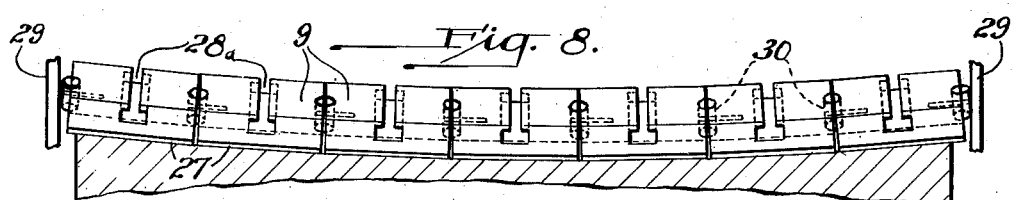
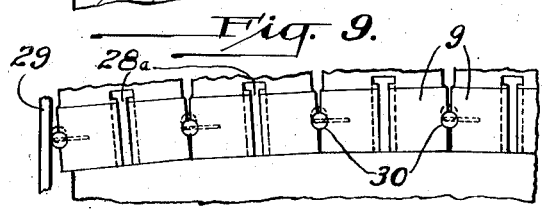
INVENTORS.
MOSES E. BROOKS.
ARTHUR T. DEILY.
ATTORNEY.

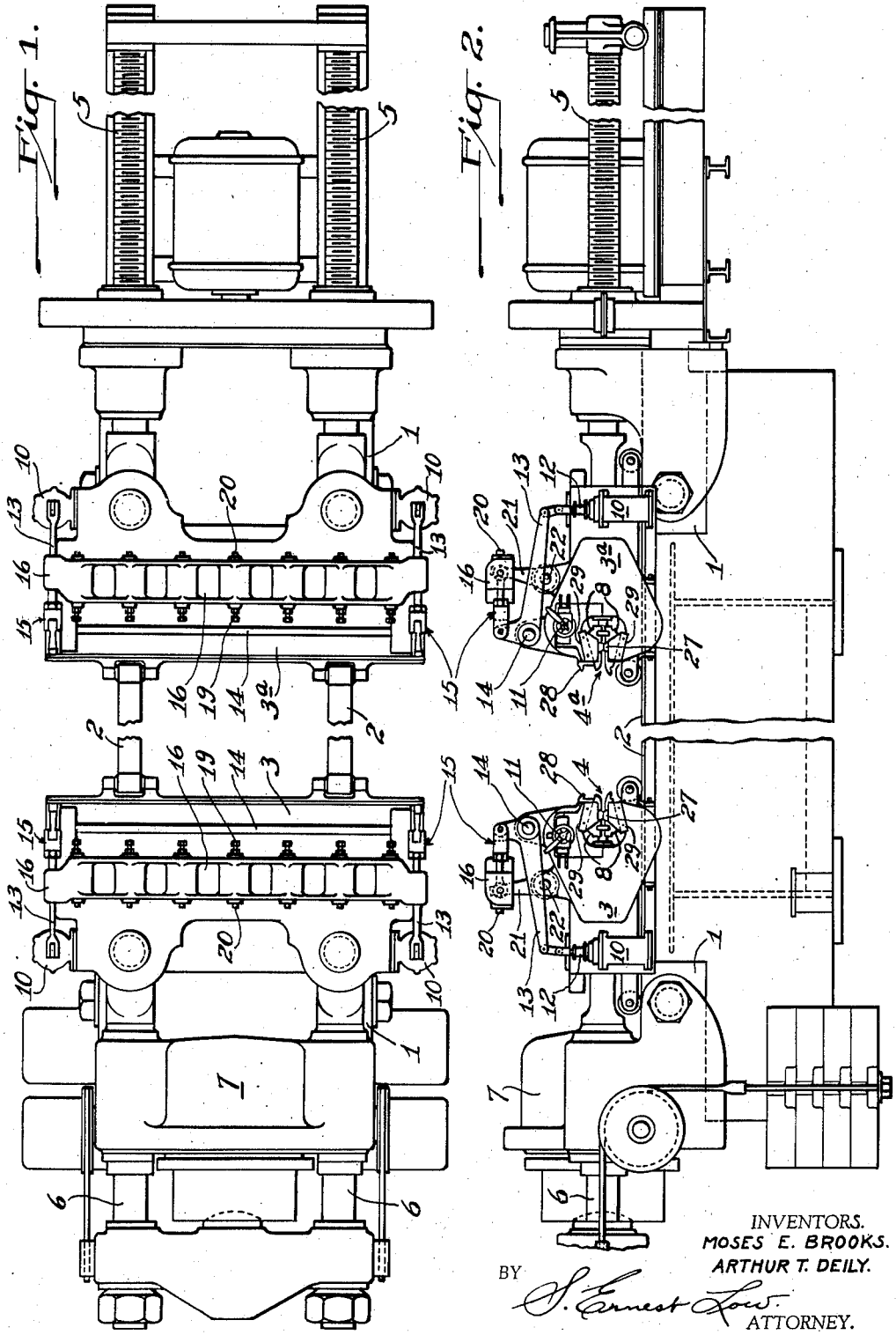

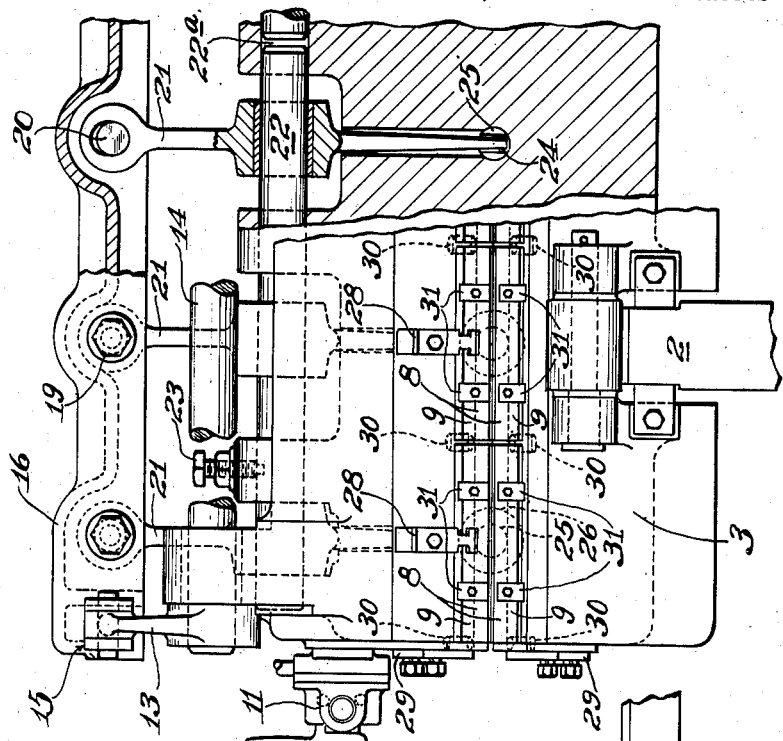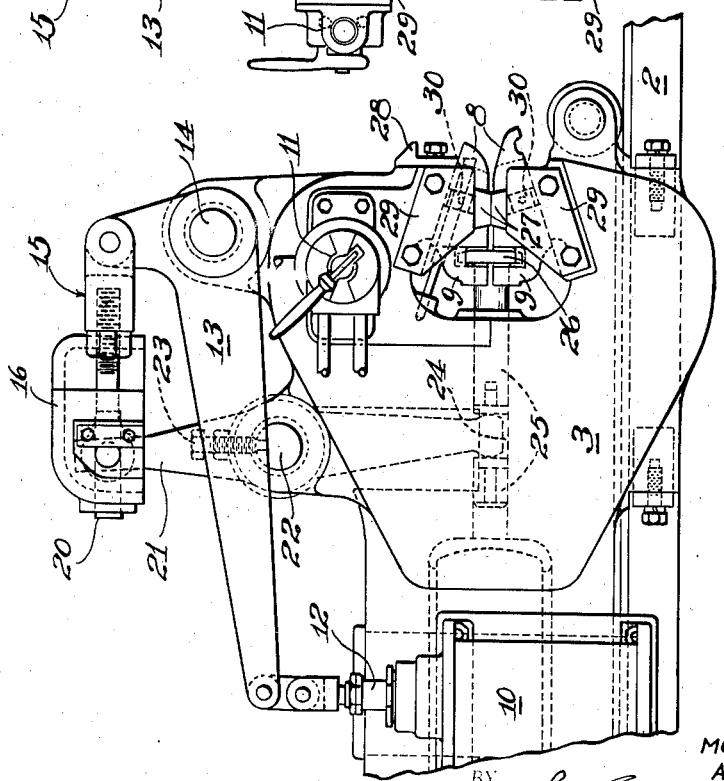

Patented Oct. 22, 1940

2,218,503

UNITED STATES PATENT OFFICE 2,218,503

STRETCHING MECHANISM

Moses E. Brooks and Arthur T. Deily, Pittsburgh, Pa., assignors to Aluminum Company of America, Pittsburgh, Pa., a corporation of Pennsylvania Application December 14, 1938, Serial No. 245,617

10 Claims. (Cl. 153—35)

This invention relates to stretching machines, and more particularly to a sectional jaw for gripping metal sheet, plate, strip, or the like for stretching.

Stretching machines are employed to remove certain irregularities of size and shape that are produced in sheet, plate, strip, and the like after the application thereto of working or thermal processes. Sheet metal coming from these processes often is bent, warped, or buckled to some degree, requiring straightening; and the gauge of such material often varies, being generally thinner or thicker at intermediate portions than at the edges.

A common and simple method of removing major irregularities is to place the whole sheet under tension and thus stretch at least portions of it to a point beyond the elastic limit; this operation removes waves and buckles, releases some of the internal stresses, and equalizes some minor gauge variations.

The essential features of a machine for stretching sheet and like material are a frame or bed, on which are positioned two stretching heads containing jaws for gripping the material at each end. One head may be positionable to accommodate various lengths of sheet, and the other movable by hydraulic or mechanical means to stretch the sheet.

This invention is concerned with the stretching heads, and particularly relates to stretching head jaws designed to grip the material uniformly. In the prior art, stretching heads have been employed in which one jaw with single upper and lower members has been used to grip the full width of the sheet. In the use of a single jaw, irregularities in both gauge and shape of sheet have caused unequal gripping of the sheet, resulting in uneven distribution of the stretching forces, and oftentimes causing uneven stretching, tearing, or over-stretching.

Some attempts to solve the problem of evenly gripping sheet of irregular gauge and shape have resulted in the provision of a stretching head having a group of individual jaws, each member of which would be assured of gripping a portion of the sheet. An inherent fault in prior machines incorporating this feature has been that one member gripped the sheet at a portion in advance of the next one, the result being that the sheet would tear immediately upon application of the stretching force. Also, heretofore, many types of stretching machines have depended almost wholly on the tension of the work for drawing the jaws into engagement therewith.

An important object of this invention is to provide a sectional gripping jaw for a sheet stretching machine made up of a plurality of cooperating jaw members or segments, each of which will automatically adjust itself in cooperation with the others to grip the sheet positively, despite variations in gauge, whereby uniform and even distribution of the tensile forces may be imparted to the sheet being stretched.

A further object of this invention is to provide a sectional gripping jaw, comprising individual jaw members, which will exert enough pressure on the sheet to grip it at all positions substantially continuously, despite variations in cross-sectional contour, as distinguished from variations in gauge.

Another object of this invention is to provide a sectional gripping jaw in which the jaw or gripping members are correlated with each other so that they may be actuated and freely self-adjusted to the position, gauge, and contour of the sheet being stretched, and yet constrained so that, when actuated, the whole group of gripping members grips the sheet in an evenly changing line of engagement approximating a curve, or series of curves.

Another object is to provide in a stretching machine or the like an articulated gripping jaw capable of flexible engagement with a work piece, and to provide yieldable means for actuating such jaw.

The nature and scope of this invention, and further objects thereof, may be understood more fully from the accompanying drawings and description, in which:

Fig. 1 is a plan view of a sheet stretching machine;

Fig. 2 is a side elevation of the sheet stretching machine shown in Fig. 1;

Fig. 3 is a side elevation of one of the stretching heads containing a sectional gripping jaw, being an enlargement of, and in more detail than, a portion of Fig. 1;

Fig. 4 is a fragmentary front elevation, partly in section, of the stretching head and sectional jaw shown in Fig. 3, taken in the direction in which the work enters the jaw (the portion not shown having substantially symmetrical parts);

Fig. 5 is a top section, in part, of a beam and spring assembly on the stretching head shown in Figs. 3 and 4;

Fig. 6 is an enlarged view of a jaw member and a projection thereof showing its relation with an adjacent jaw member;

Figs. 7 and 8 show the engagement of upper jaw members with irregular work, on an exaggerated scale, in similar front views, the stretching head and lower jaw members being removed; and Fig. 9 is a partial plan view of the jaw members and work shown in Fig. 7.

With reference now to the drawings, in which like numerals identify like parts, the sheet stretching machine shown in Figs. 1 and 2 may be seen to include a main frame 1 on which are mounted two opposed stretching heads 3 and 3a. These stretching heads are movable on tracks 2; and one head 3a is positionable by means of a motor, engaging screws 5 through suitable gears, to accommodate varying lengths of work to be inserted between the stretching heads. The other head 3 is directly connected to a pair of strain rods 6, which receive the force of a ram from a hydraulic or other suitable fluid-actuated piston and cylinder 7 through a cross head. The hydraulic ram exerts the force necessary to stretch the sheet between the two heads. Return travel of the hydraulic piston and head 3 may be effected by means of a pair of counter weights shown, but not numerically identified.

The stretching heads 3 and 3a are similar in their construction, except as to the means for positioning these heads relative to each other along the aforedescribed tracks 2. The heads 3 and 3a are each suitably recessed, gripping jaws 4 and 4a being respectively positioned within the recessed portions thereof which are constructed with outwardly converging inclined plane surfaces. Since both of the heads are similar in construction insofar as the gripping jaws and their manner of manipulation are concerned, stretching head 3, illustrated to best advantage in Figs. 3 through 5, has been selected for detailed description.

Sectional gripping jaw 4, received within and supported by stretching head 3, is composed of a plurality of jaw sections 8 comprising opposing pairs of upper and lower jaw members 9. The jaw members 9 are actuated in pairs, as jaw sections 8, by means of like linkages disposed on either side of the head 3. The linkages referred to are similar, being operable through the medium of a pair of fluid pressure cylinders 10. A suitable hand controlled valve 11 controls and directs fluid pressure, such as air pressure or the like, into and out of either end of the cylinders 10, the protruding piston rods 12 of which each engage one arm of bell-cranks 13 through suitable clevis connections. The bell-cranks 13 are oscillatably mounted upon a through shaft 14 and the other arm of each bell-crank is connected to a cross-beam member 16 by means of an adjustable clevis and threaded eye-bolt linkage represented in its entirety by the reference numeral 15. From this construction it will be apparent that beam member 16 is oscillatably movable relative to shaft 14 in accordance with the oscillatable movement imparted to the aforementioned bell-cranks 13 in direct response to pressure admitted or exhausted from the cylinders 10.

Cross beam 16 engages and is normally substantially horizontally supported by the ends of a plurality of pivotally supported levers 21. Pins 20 secured to the beam 16 and extending through bosses in the beam and through slightly enlarged apertures in the ends of the levers 21, in cooperation with coil springs 17 (Fig. 5), constitute a flexible or yieldable connection between the beam 16 and the levers 21. The coil springs 17 preferably surround one end of pins 20 and bear against the levers 21, the opposite ends of springs 17 being engaged by spring seats 18 on adjustable loading screws 19. The loading screws 19 pass through, and are in threaded engagement with, a wall or flange of beam 16, illustrated to best advantage in Fig. 5, which beam takes the general form of an inverted channel with the flanges normally downwardly disposed. Levers 21 are substantially centrally supported upon, and oscillatable upon, a disjointed shaft 22, which is supported within the head 3; and the lower ends of levers 21 engage suitable push rods 25 in slots 24 therein (Figs. 3 and 4), the push rods 25 being slidingly supported within the main casting of the head 3. Shaft 22 may be disjointed, as at 22a (Fig. 4), for ease of assembly and adjustment of the mechanism. Set screws 23 in threaded engagement within suitable threaded apertures in the head 3, and extending into suitable cavities in both parts of the shaft 22, hold and secure both parts of this shaft in spaced relative position with respect to the stretching head 3. The push rods 25 have circular heads 26, rounded as at 26a (Fig. 6), which slidably engage pairs of upper and lower slidable jaw members 9, in recesses therein (Fig. 3), for actuating them as jaw sections 8 (Fig. 4). Jaw members 9 are provided with suitable gripping inserts 27 having knurled or serrated opposed surfaces for gripping the work to be subjected to a stretching operation.

Each upper jaw member 9, having a T-slot 28a therein, is held in relatively free, sliding engagement with the upper inclined surface of head 3 by a T-slotted keeper bar 28, the keeper bars 28 being secured, as by bolts, to the face of the head 3, and disposed substantially centrally of jaw members 9. The lower jaw members 9 are retained on the lower inclined surface of head 3 by their own weight. End retaining plates 29 are also provided to protect and retain the extreme end gripping-jaw members 9 within the stretching head casting 3.

Disposed between each adjacent pair of upper jaw members 9, between each adjacent pair of lower jaw members 9, and between the extreme outer jaw members 9 and end retaining plates 29 (Figs. 3, 4, 6, 7, 8, and 9), are short swivel pins 30. The intermediate pins 30 are engaged in relatively free-fitting, semi-cylindrical bearing surfaces formed in adjacently disposed ends of the jaw members 9, and the end pins 30 may have sliding contact with retaining plates 29. The pins 30 may be retained in their bearings by suitable dowel pins, if desired. These swivel pins 30 act to space and constrain the jaw members 9, and at the same time permit relative angular movement therebetween. Also, suitable lubricating fittings 31 are provided in each jaw member 9 for the purpose of minimizing frictional resistance between the inclined bearing surfaces of the jaw members 9 and the stretching head casting 3.

In the preferred form of the invention, it is to be noted that seven pivotally supported levers 21 engage with an equal number of push rods 25 at their lower ends, while the upper ends of the levers 21 are supported and connected through the aforedescribed yieldable, adjustable, spring connection to the cross beam member 16. From this construction, then, it will also be noted that oscillatable movement of the beam member 16 will advance or retard push rods 25 in a substantially horizontal plane, as a result of which, an equal number of pairs of upper and lower jaw members 9, forming jaw sections 8, will be simultaneously moved over their converging supporting surfaces within the stretching head 3.

In order that this invention may be more fully understood, the function of a sheet stretching machine embodying the novel gripping jaw of this invention is explained in conjunction with a more detailed description of the operation of the sectional jaw members.

Referring to the mechanism illustrated in Figs. 1 and 2, the stretching head 3a may be moved through the medium of the aforementioned motor in driving engagement with screws 5 attached to the stretching head, to any desired position along tracks 2, sufficiently separated from the stretching head 3 so that the work, a sheet of material or the like, may be inserted between the heads 3 and 3a. Gripping jaw 4a may then be closed upon the work in a manner which will be hereinafter described with respect to gripping jaw 4. Thereafter either stretching head 3 or 3a may be translated so as to bring the opposite end of the work into position within gripping jaw 4. It will be apparent that the reverse procedure may be followed by first closing the jaw 4 upon the work, and thereafter translating either head into position for jaw 4a to engage the opposite end of the work. Side entry of the work into the open space between the jaws will also be possible, as is apparent from the illustrations depicting the mechanism, without the necessity of translating the heads 3 and 3a, by proper selection of the length of material to be stretched.

With the gripping jaw 4 open, the work will lie on the lower jaw members 9, which rest on the lower inclined surface of the stretching head 3. The upper jaw members 9 will be retained in bearing contact with the upper inclined surface of the recess by means of the aforedescribed keeper bars 28. By suitable manipulation of valve 11, pressure may be introduced into the upper ends of cylinders 10, whereby bell-crank levers 13 will be oscillated in a counter-clockwise direction, as viewed in Figs. 2 and 3, to advance push rods 25. As a result of the forward movement of push rods 25, it will be seen that the upper and lower jaw members or segments 9 will be moved, bringing the serrated gripping inserts 27 into bearing and gripping relationship with the material within the jaw 4.

The automatic operation of a gripping jaw is hereinafter described as follows: Pressure admitted to the upper sides of pressure cylinders 10 pushes the pistons and draws piston rods 12 downward. Bell-cranks 13 are rotated by the pull of rods 12 and push the cross beam 16 through clevis and eye-bolt units 15. The through shaft 14 equalizes the forces exerted by the two pressure cylinders 10 and equalizes the reaction forces exerted on the bell-cranks 13 at either end of cross beam 16. Adjustable clevis and eye-bolt units 15 permit adjustment of the two cylinder linkages for coordination in their action on cross beam 16. Following through the application of pressure that is exerted upon the beam 16, it will be seen that cross beam 16 exerts a force upon the ends of levers 21 through the coil springs 17. The springs 17, or some of them, react to absorb overtravel of beam 16 with respect thereto as each jaw section 8 comes into engagement with the work, in a manner which will be hereinafter described.

Levers 21 rock or oscillate on shaft 22 and, through engagement with push rods 25 in slots 24 therein, push the rods 25 forward. The round disk head 26 on each push rod 25 horizontally engages one pair of upper and lower jaw members 9, comprising a jaw section 8. The inclined, outwardly converging surfaces of the recess in the stretching head reacts to cause the jaw members to close on, and engage the work piece under the horizontal force thus exerted.

As the work piece is fully engaged by the gripping jaw 4 in stretching head 3, assuming jaw 4a to be closed in the same manner, a valve is opened to apply pressure, preferably hydraulic pressure, to the cylinder 7, drawing stretching head 3 away from head 3a tending to stretch the work piece and, if there be any portions of the jaws 4 and 4a not fully closed, tending to draw those portions into tighter engagement with the work piece.

After the stretching operation is completed, pressure is released from cylinder 7, and the pressure in cylinders 10 is reversed by manipulation of valves 11. Since all of the elements of the linkages actuating the jaw sections 8 are positive in both directions, except for the yieldability afforded by springs 17, the jaws will be immediately withdrawn from the work upon the reversal of the pressure in cylinders 10. If any of the gripping inserts 27 in either jaw stick or freeze to the work, a movement of either head 3 or 3a toward the other will readily free the work piece. The movable head 3a is then withdrawn and the work removed, or if desired, on release of the jaws from engagement with the work it may be withdrawn sideways.

With reference to Figs. 3 to 5, and particularly to Figs. 6 to 9, the following elements of the combination should be noted. The coil springs 17, which may have many equivalents, permit a variation in the increment of movement or advancement of the levers 21, the push rods 25, and eventually the jaw sections 8. Adjustable screws 19 permit a definite or predetermined loading of any or all of the springs 17, by drawing spring seats 18 into closer proximity with lever pins 20, to allow for the degree of free, self-adjustment desirable in the jaw sections. For this reason springs 17 and screws 19 are located where they will be easily accessible to adjustment. Pins 20 may engage levers 21 in relatively free apertures therein to permit relative angular disposition of levers 21 with respect to beam 16 and with respect to each other. Push rod heads 26 may be relieved slightly as at 26a (Fig. 6), to permit small angular displacement of the jaw members 9 with respect to the push rods and stretching head; and similar relief may be given keeper bars 28 for the same purpose.

The swivel pins 30, relatively freely recessed between pairs of upper jaw members 9, and likewise between pairs of lower jaw members, serve to prevent adjacent edges of the jaw members or sections from being displaced in a forward direction independently of each other, and they separate adjacent members or sections sufficiently to permit angular displacement of each with respect to its adjacent member or section. Similar location of swivel pins 30 between outside jaw members 9 and retainer plates 29 has been provided, by relatively freely recessing the jaw members 9 to accommodate the pins and by leaving the plate surface plane, so that there is angular constraint only at these extreme end positions. Freedom between pins 30 and recesses therefor, in jaw members 9, is provided for permitting ease of adjustment of one jaw member to an adjacent one. The pins 30 may be located if desired by dowels (Fig. 6). Extreme positions of the upper jaw members 9, on an exaggerated scale, are shown in Figs. 7, 8, and 9. Corresponding sections of irregular sheet are shown on an exaggerated scale, as being engaged by the upper jaw members 9. Thus it may be seen that the operation and coordination of the jaw members is such that they are articulated in the planes of the inclined surfaces of the recess in the stretching head to engage work of irregular dimensions.

The pressure which the jaw members are capable of exerting may be sufficient to press out waves and buckles in the edges of the work as the gripping jaw closes upon it, and the foregoing arrangement of the jaw members makes them capable of adjusting and accommodating themselves to sheet material of varying thickness and contour.

It should be pointed out that this invention is capable of application to a jaw structure in which only the lower or upper jaw is sectional, or composed of a plurality of segments. In such an application one jaw would employ the yieldably actuated, articulated elements of this invention and the other could consist of a flat jaw plate, or a movable single jaw member of similar form.

Since it is believed that this is the first instance in which an articulated gripping jaw has been conceived, it is intended that the claims appended hereto should be construed only with the limitations imposed by the prior art, and that apparatus incorporating an articulated jaw, whether slidably or otherwise yieldably actuated, should be considered within the scope of the invention defined by the appended claims when read in the light of this specification.

What is claimed is:

1. In a mechanism of the character described, a tension-applying head having a recess therein, a surface of said recess being inclined, a material-gripping jaw supported within said recess, said jaw incorporating a plurality of segments, said segments being slidingly supported upon said inclined surface and inter-associated for substantially angular movement with respect to one another, and actuating means associated with said segments adapted to bring said jaw into material-gripping relationship.

2. In a mechanism of the character described, a tension-applying head having a recess therein, said recess having opposed, outwardly-converging, inclined surfaces, material-gripping jaws supported within said recess in cooperative relationship, at least one of said jaws incorporating a plurality of segments, said segments being slidingly supported upon one of said inclined surfaces and inter-associated for angular movement relative to one another, and jaw-actuating means associated with said segments, said jaw-actuating means, in cooperation with said slidingly-supported, angularly movable segments, being adapted to adjustably grip material of varying gauge.

3. In a stretching machine and the like, a tension-applying head having an inclined surface therein and comprising opposing jaws, one of said jaws incorporating a plurality of articulated sectional jaw members slidingly retained on said inclined surface, means for actuating said jaws to engage opposite sides of a work piece, said means adapted to permit relative adjustment of said jaw members to varying thickness of the work piece, and means for constraining each jaw member substantially to angular disposition relative to each immediately adjacent jaw member about an axis therebetween perpendicular to said inclined surface.

4. In a sheet stretching machine and the like, a tension-applying head having a recess therein with opposing, outwardly-converging surfaces, opposed work-engaging jaws slidingly retained on said surfaces, at least one of said jaws incorporating a plurality of articulated sectional jaw members, pivot members between adjacent jaw members adapted to constrain each of said jaw members substantially to angular disposition relative to immediately adjacent jaw members, whereby a sectional jaw is adapted to be articulated on a surface of the recess, means for advancing said jaws to engage work positioned within the jaws, and yieldable means associated with said jaw advancing means and said jaw members for permitting relative adjustment of said jaw members to work of varying gauge and contour.

5. In a sheet stretching machine, a tension-applying head having a recess therein with opposed converging surfaces, opposed sectional work-gripping jaws supported within said recess comprising a plurality of opposed sectional articulated jaw members in juxtaposition slidingly retained on said surfaces, means for actuating each of said jaw members to engage opposite sides of the work, said means being adapted to permit relative adjustment of said jaw members to work of varying thickness, and means for constraining each of said jaw members substantially to angular disposition relative to adjacent jaw members.

6. In a sheet stretching machine of the character described, the combination for securing an end of work to be stretched comprising a tension-applying head having a recess therein with opposing, outwardly-converging, inclined surfaces, a pair of opposing, sectional, articulated jaws incorporating a plurality of individual jaw members slidable on said surfaces, means for retaining said jaw members in slidable contact with said surfaces, pivot members between adjacent jaw members adapted to constrain said jaw members substantially to angular articulation with respect to each other, a plurality of jaw-actuating members each engaging a pair of oppositely disposed jaw members and adapted to effect engagement of a pair of jaw members, as a jaw section, with the work, means for simultaneously moving said jaw-actuating members, and yieldable means associated with each jaw-actuating member and said means for moving the jaw-actuating members, whereby the said jaw sections may accommodate themselves to the work in a substantially evenly changing articulated line of engagement despite variations in gauge and contour of the work.

7. In a machine for tensioning material, a tensioning head having a recess therein with an inner-surface inclined to the direction of stretching, a material clamping jaw slidingly retained on said inclined surface, said jaw comprising a plurality of articulated sectional jaw members in juxtaposition, yieldable means for actuating said jaw members to simultaneously clamp the material to be tensioned, and pivot members between adjacent jaw members having their axes perpendicular to said inclined surface and adapted to constrain each of said jaw members substantially to angular disposition relative to immediately adjacent jaw members, whereby said sectional jaw is adapted to be articulated on said inclined surface of said recess.

8. In a mechanism of the character described, a tension-applying head having a recess therein, a surface of said recess being inclined, a work-engaging jaw slidingly retained on said inclined surface, said jaw incorporating a plurality of articulated sectional jaw members, pivot members between adjacent jaw members adapted to constrain each of said jaw members substantially to angular disposition relative to immediately adjacent jaw members, whereby said jaw is adapted to be articulated on said inclined surface, and actuating means for advancing said jaw members to engage work positioned within said recess.

9. In a mechanism of the character described, a tension-applying head having a recess therein, a surface of said recess being inclined, a jaw holder supported within said recess, a material-gripping jaw member supported in said jaw holder, said jaw holder incorporating a plurality of segments slidingly supported upon said inclined surface and associated for substantially angular movement with respect to one another, and actuating means associated with said segments adapted to bring said jaw member into material-gripping relationship.

10. In a mechanism of the character described, a tension-applying head having a recess therein, a surface of said recess being inclined, a jaw holder supported within said recess, a material-gripping jaw member supported in said jaw holder, said jaw holder incorporating a plurality of segments slidingly supported upon said inclined surface, actuating means associated with said segments adapted to bring said jaw member into material-gripping relationship, and means for constraining each of said segments substantially to angular disposition relative to each immediately adjacent segment about an axis therebetween perpendicular to said inclined surface.

MOSES E. BROOKS.
ARTHUR T. DEILY.